(12) United States Patent
Lingamneni

(10) Patent No.: US 7,653,905 B1
(45) Date of Patent: Jan. 26, 2010

(54) SYSTEM AND METHOD FOR MANAGEMENT OF REQUESTS

(75) Inventor: Krishna K. Lingamneni, Phoenix, AZ (US)

(73) Assignee: American Express Travel Related Services Company, Inc., New York, NY (US)

(*) Notice: Subject to any disclaimer, the term of this patent is extended or adjusted under 35 U.S.C. 154(b) by 942 days.

(21) Appl. No.: 10/906,279

(22) Filed: Feb. 11, 2005

Related U.S. Application Data

(60) Provisional application No. 60/522,266, filed on Sep. 8, 2004.

(51) Int. Cl.
G06F 9/46 (2006.01)
G06F 3/00 (2006.01)
G06F 9/44 (2006.01)

(52) U.S. Cl. ........................ 718/100; 718/101; 718/104; 719/313; 719/314

(58) Field of Classification Search ......... 719/313–314; 718/100–101, 104
See application file for complete search history.

(56) References Cited

U.S. PATENT DOCUMENTS

| | | | |
|---|---|---|---|
| 5,349,657 A | 9/1994 | Lee | |
| 5,548,704 A | 8/1996 | Steiner et al. | |
| 5,710,889 A | 1/1998 | Clark et al. | |
| 5,752,031 A * | 5/1998 | Cutler et al. | ................ 718/103 |
| 5,940,813 A | 8/1999 | Hutchings | |
| 6,006,263 A | 12/1999 | Horwitz | |
| 6,006,277 A | 12/1999 | Talati et al. | |
| 6,070,197 A | 5/2000 | Cobb et al. | |
| 6,216,164 B1 | 4/2001 | Zaremba, Jr. | |
| 6,230,117 B1 | 5/2001 | Lymer et al. | |
| 6,289,393 B1 | 9/2001 | Phillips et al. | |
| 6,324,563 B1 | 11/2001 | Hotea et al. | |
| 6,442,568 B1 | 8/2002 | Velasco et al. | |
| 6,473,500 B1 | 10/2002 | Risafi et al. | ............ 379/144.01 |
| 6,473,807 B1 | 10/2002 | Hills et al. | |
| 6,519,643 B1 | 2/2003 | Foulkes et al. | |
| 6,532,463 B1 | 3/2003 | Robbins et al. | |
| 6,612,487 B2 | 9/2003 | Tidball et al. | ................ 235/380 |
| 7,051,330 B1 * | 5/2006 | Kaler et al. | .................. 718/106 |
| 7,509,643 B2 * | 3/2009 | Qiu et al. | ..................... 718/103 |
| 2002/0042849 A1 | 4/2002 | Ho et al. | |
| 2002/0087366 A1 | 7/2002 | Collier et al. | |
| 2002/0178299 A1 | 11/2002 | Teubner | |
| 2003/0236926 A1 * | 12/2003 | Malville et al. | ............. 709/328 |
| 2004/0015499 A1 | 1/2004 | Silverman et al. | |
| 2004/0034719 A1 | 2/2004 | Peterson et al. | |

* cited by examiner

Primary Examiner—Hyung S Sough
Assistant Examiner—Qing-Yuan Wu
(74) Attorney, Agent, or Firm—Fitzpatrick, Cella, Harper & Scinto

(57) ABSTRACT

The present invention provides an online messaging architecture configured to process incoming request messages and provide reply messages in an efficient manner. The invention reduces processing overhead within a mainframe computing environment were individual requests are treated as individual transactions by instead storing requests within a queue, spawning necessary processes according to the queue and processing multiple transactions in a pseudo batch manner.

6 Claims, 4 Drawing Sheets

SYSTEM AND METHOD FOR MANAGEMENT OF REQUESTS

CROSS-REFERENCE TO RELATED APPLICATIONS

This invention claims priority to U.S. Provisional Application Ser. No. 60/522,226, entitled "ONLINE MESSAGING ARCHITECTURE," filed on Sep. 8, 2004, the contents of which are incorporated herein by reference.

FIELD OF INVENTION

The present invention generally relates to managing requests within a mainframe computing environment, and more particularly, to systems and methods for increasing processing efficiency within a mainframe environment.

BACKGROUND OF INVENTION

Despite innovations leading to more robust and efficient computing systems and software, the role of mainframe computing remains vital to many businesses and organizations. In most cases, mainframe computing systems that are in use today were originally implemented prior to the computing innovations of the 1980's and 90's. However, many businesses and organizations have concluded that it would be too expensive and too intrusive to day-to-day business operations to upgrade their major systems to newer technologies. Therefore, to enable continued expansion of computing infrastructures to take advantage of newer technologies, much effort has been devoted to developing ways to integrate older mainframe technologies with newer server and component based technologies. Moreover, methods have been developed to add functionality to mainframe computers that were not previously available and to increase processing speed and efficiency.

One example of such mainframe technology is IBM's Customer Information Control System (CICS). CICS is a transaction process monitor that was originally developed to provide transaction processing for IBM mainframes. It controls the interaction between applications and users and allows programmers to develop screen displays without detailed knowledge of the terminals being used. The CICS architecture also includes support for building and using databases. According to the CICS architecture, transactions are executed to process a single request per CICS transaction, thereby incurring increased overhead wherein the overhead may include, for example, starting up a transaction for every single request, CPU costs, etc.

Therefore, a need exists for a system and method for increasing computing efficiency and speed within a mainframe environment where individual requests are typically processed as individual transactions. In order to process requests and provide reply messages in the shortest time possible and at the lowest cost, there is a need for a system that can process messages without fully incurring processing overhead usually associated with transaction startup.

SUMMARY OF INVENTION

The invention includes a Messaging Formatting Module (MFM) architecture to overcome the disadvantages of traditional messaging architectures. In one embodiment, the invention provides a global single entry point to engage an enterprise infrastructure. As such, the invention overcomes the limitations of the traditional CICS messaging architecture by, for example, reducing the overhead cost of starting new transactions.

More particularly, the invention increases messaging efficiency for transactions (that were previously executed to process a single request per CICS transaction), thereby reducing overhead. In one embodiment, the invention includes an online messaging architecture using a pseudo batch processing solution. The invention processes the request messages originating from any number of interfaces, and provides reply messages in a timely and cost efficient manner. The invention executes long running application transactions and process multiple message requests concurrently as they arrive through a single transaction (e.g., CICS transaction). This pseudo batch approach may, for example, help to reduce the CICS overhead, process the messages in a cost efficient manner, increase system processing capacity, decrease the average CPU resources consumed during message processing, reduce processing bottlenecks, increase throughput, quickly process message requests with reduced response times and fewer timeouts, and cut in half CPU cost of processing. The response time to deliver the message may be reduced by 30%, and timeouts may be reduced by over 50%. While the invention may be described with respect to CICS transactions, the invention contemplates other types of transactions. Moreover, the invention may be used by any mainframe online application world wide, including CICS applications which are used by most of the online mainframe applications in use by businesses today.

As the CICS transactions may be running in a pseudo batch fashion, there is no need to start a new CICS transaction for every single request message; rather, the invention maintains enough CICS active transactions to process the messages in the request queue in a timely fashion. To this effect, a suitable spawning logic executes the right number of CICS transactions to process the messages as they arrive. The messaging architecture encompasses the spawning logic, which reacts to the message arrival rate in order to maintain the right number of CICS active transactions. When there is a need to spawn additional transactions to correspond with an increase in the arrival rate of the messages, the architecture will start new transactions.

Moreover, to overcome the disadvantages of the traditional messaging architecture, the invention can also be implemented in the MFM architecture. The MFM architecture does not incur the overhead cost of starting a new transaction as much as the traditional architecture. Overhead is reduced by processing more than one message through one transaction. As a result, the transactions are long running tasks. To make this possible, the Router, MQ I/O Module, and MFMs are all executed at the same CICS level resulting in storage that is not re-acquired when these modules are executed again and again while processing multiple messages. By processing the messages in pseudo batch fashion, the overhead required to start a new CICS transaction can be dramatically reduced.

More specifically, the invention facilitates the management of a request from a user by receiving the request from a user computer; storing the request into a first queue; generating a trigger message; storing the trigger message in a second queue; retrieving business logic corresponding at least in part to the request; storing a message into a thread count queue corresponding to the request; determining a number of executing threads; retrieving the request from the first queue; determining a number of threads to execute the request; formatting a reply message corresponding to the request, wherein the formatting is based upon the business logic; and, storing the reply message into a third queue.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description of exemplary embodiments herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

In general, the invention includes a system and method for managing messaging. The message management may be within a CICS environment through a messaging architecture that is configured to spawn transactions in response to request volume and/or to process more than one message through a single transaction. Moreover, referring to FIG. 1, the messaging architecture of the invention employs an additional processing layer 175, wherein an initiator program 125 traps program errors and perform any desired wrap-up processing.

As will be appreciated by one of ordinary skill in the art, the invention may be embodied as a customization of an existing system, an add-on product, upgraded software, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Figure 1:
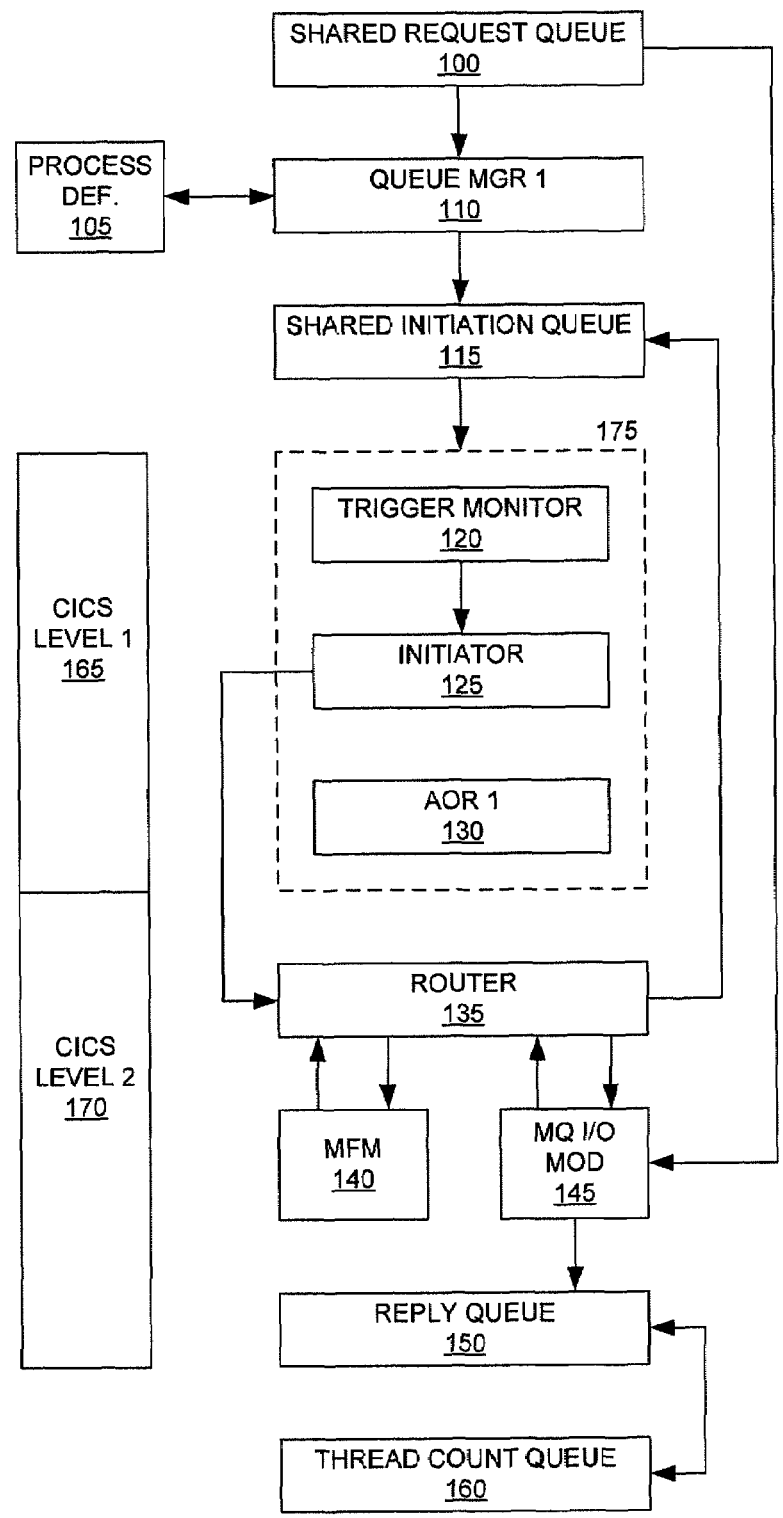
FIG. 1 is a combination block diagram and flowchart illustrating an exemplary architecture for the messaging formatting module according to one embodiment of the present invention.

Referring to FIG. 1, a trigger message is generated on receipt of a first message into the shared request queue 100 or when all threads operating on the queue are closed with no remaining messages (i.e. the open input count is greater than zero). When a request is received at the shared request queue 100, all queue managers 110 respond to the message by generating four trigger messages. The invention contemplates any number of queue managers and/or trigger messages. While an exemplary embodiment may employ any number of queue managers 110, for simplicity, only one is shown in FIG. 1. The four trigger messages are then placed in the shared initiation queue 115. The state of the initiation queue 115 is monitored by four trigger monitors 120 which, upon receiving a trigger message, invokes MFM transactions.

Upon execution of a first MFM transaction, initiator program 125 is invoked to retrieve the trigger message for use in later spawning. A trigger message is produced by queue manager 110 which in turn populates the trigger message with relevant information. For example, when an original and first thread is invoked by queue manager 110, the thread saves the trigger message that invoked the thread and then use information present in the original trigger to generate new threads. When a thread needs to spawn an additional thread, it copies the original trigger message information to the new trigger message and place it into initiation queue. This way, the threads carry on the trigger information, and use this information for starting new threads.

Moreover, initiator program also detects and process any hard abnormal ends (abend) which may result from a faulty transaction due to a software and/or hardware problem. Initiator program 125 then invokes router program 135 at CICS level 2 170. Under this architecture, all application level processing is executed at CICS level 2, while abend capture processing executes at CICS level 1. If a hard abend is encountered, program control may leave CICS level 2 and return to CICS level 1. The abend capturing process captures the abend and performs necessary abend processing. If the application is executed in CICS level 1, then the control is returned to CICS level 2 prior to taking any abend processing action.

The router program 135 retrieves a corresponding MFM control record from a CTS table 140. The MFM control record contains all the processing parameters specific to the MFM processing. After obtaining the MFM control record, router 135, queries the shared initiation queue 115 in order to obtain queue attributes such as, for example, the current queue depth, and transmit a message containing attributes to the thread count queue 160 in order to indicate that a thread has begun execution. Router 135 then calls MQ I/O Module 145 to perform MQ operations. MQ I/O Module 145 may Get the request message, and Put the thread count message. Router 135 next executes spawning logic to spawn new threads if router 135 determines that more threads are needed to process the request messages. If router 135 determines that more threads are required, then router 135 calls MQ I/O Module 145 in order to format the trigger message and put a trigger message into shared initiation queue 115.

Router 135 performs iterative processing where the message from the request queue is read and security validation is performed on the requesting user ID. Router 135 then executes MFM 140 to process the request and pass the reply back to router 135. When router 135 receives the reply, it executes MQ I/O Module 145 to put the reply messages into the reply queue 150. Router 135 also performs any necessary sync pointing, logging, error processing, spawning, relinquishing the resources and the like. These processes may be invoked periodically depending upon the frequency as defined within the CTS parameters or after processing every single message. Processing continues until there are no messages remaining in shared initiation queue 115 or until the processing limit for a specific thread is reached. When a thread is closing, spawning is again verified and the queues are closed resulting in the removal of the message from thread count queue 160 to account for the closed thread. MQ I/O Module 145 may not open and close the queue for every message it processes. Rather it may open the queue and store the object handle; using the object handle for processing all the messages.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, provider data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. user computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography &

Network Security: Principles & Practice" by William Stallings, published by Prentice Hall; all of which are hereby incorporated by reference.

Each participant in the present invention may be equipped with a computing device in order to interact with messaging utility. As previously described, user may have a computing unit in the form of a personal computer, although other types of computing units may be used including laptops, notebooks, hand held computers, set-top boxes, cellular telephones, touch-tone telephones and the like. In one embodiment, the internal client may have a computing unit implemented in the form of a computer-server, although other implementations are contemplated by the invention. The messaging utility as shown may comprise one or more mainframe computers. However, the messaging utility may be implemented in other forms, such as a mini-computer, a PC server, a network of computers located in the same of different geographic locations, or the like. Moreover, the system contemplates the use, sale or distribution of any services or information over any network having similar functionality described herein.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Figure 2:
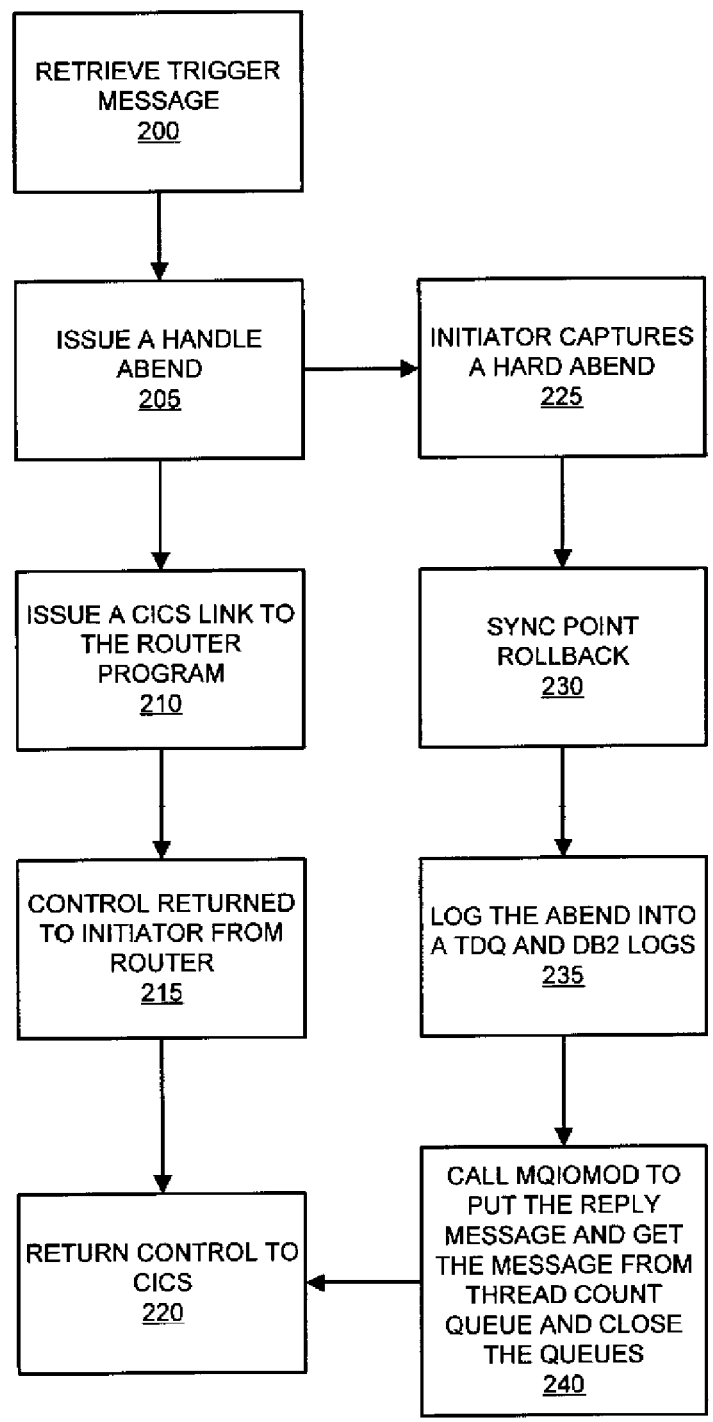
FIG. 2 is a flowchart illustrating a view of exemplary message processing at the initiator level according to one embodiment of the present invention.
Figure 3A:
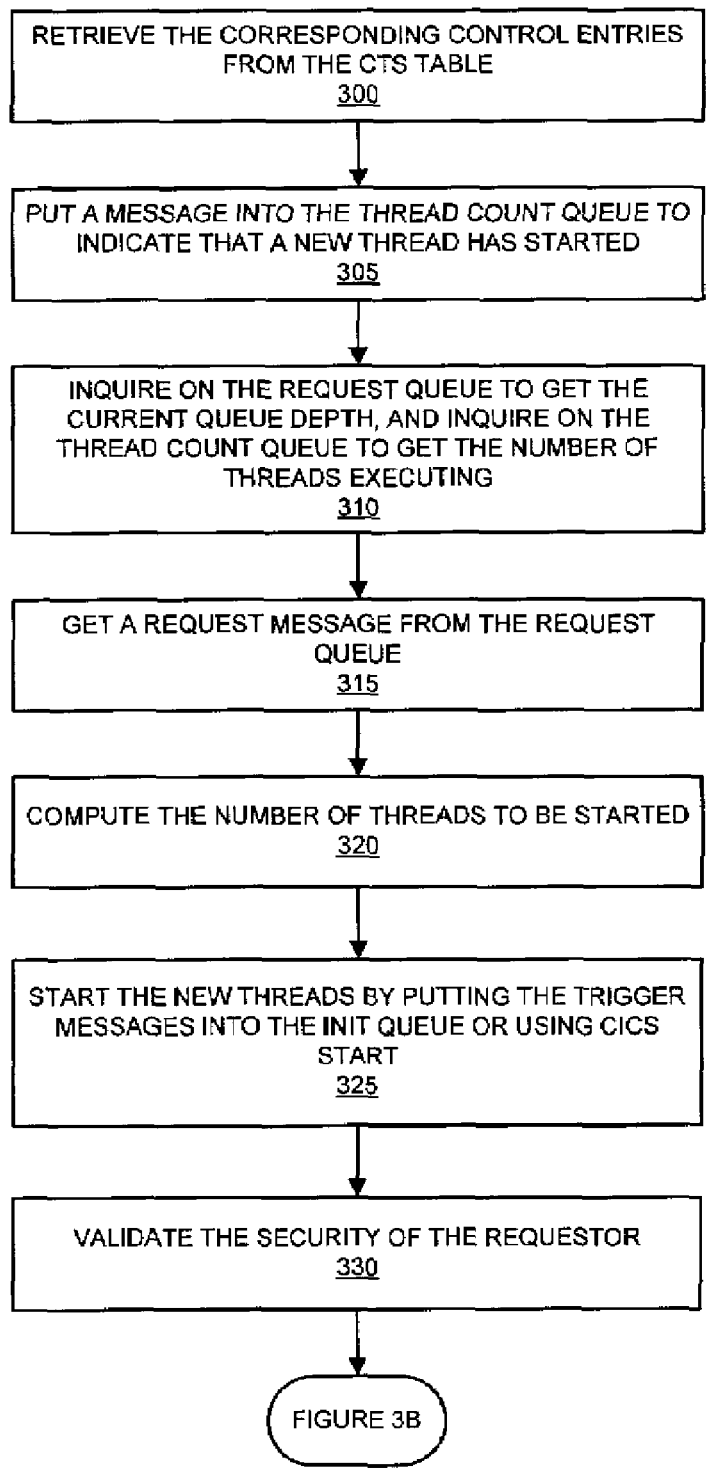
FIGS. 3A-B are a flowcharts illustrating a detailed view of an exemplary message processing method within CICS according to one embodiment of the present invention.
Figure 3B:
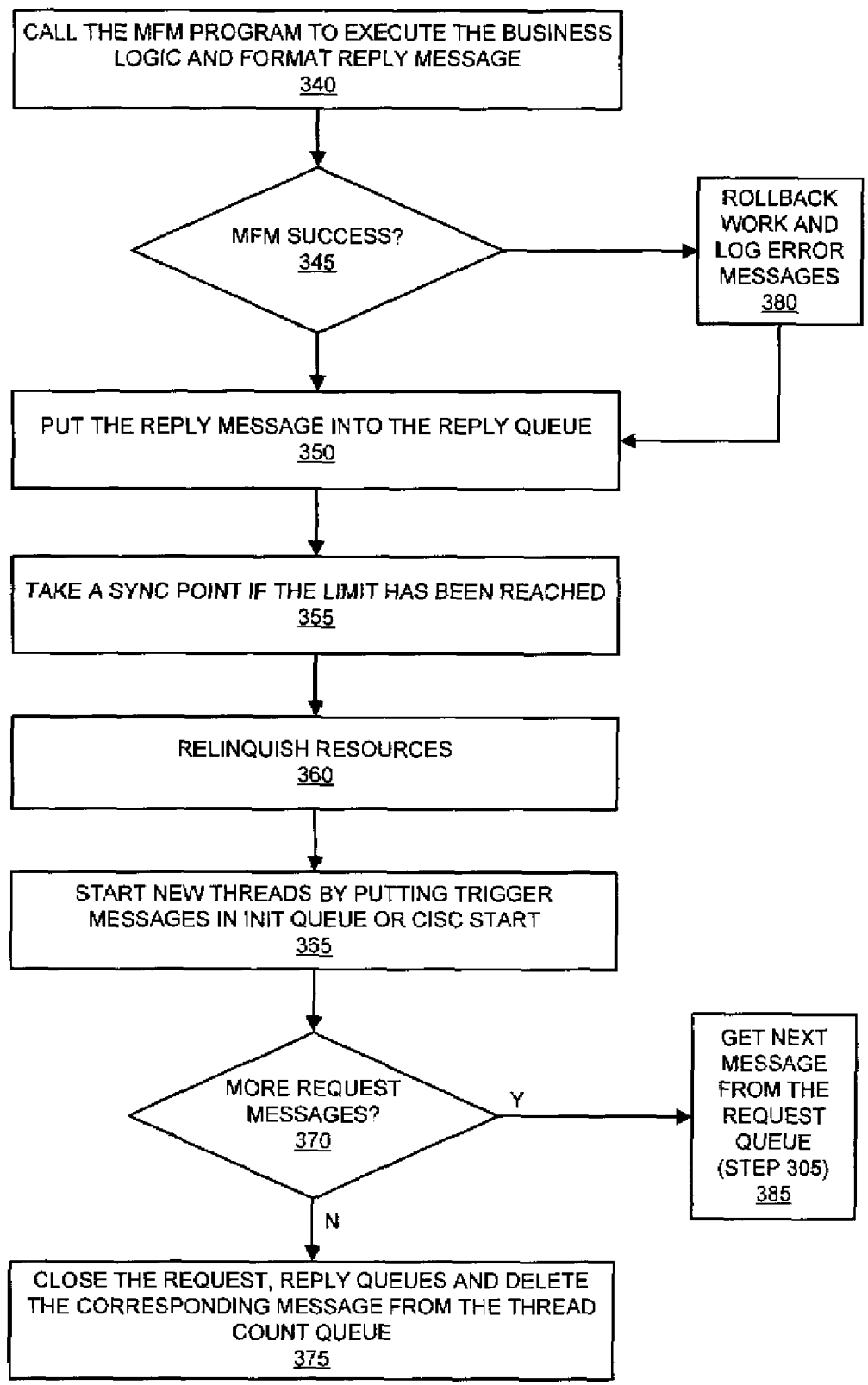

Referring now to FIGS. 2, 3A and 3B, the process flows depicted are merely exemplary embodiments of the invention and are not intended to limit the scope of the invention as described herein. For example, the steps recited in any of the method or process descriptions may be executed in any order and are not limited to the order presented. It will be appreciated that the following description makes appropriate reference to not only to the steps depicted in FIGS. 2, 3A and 3B, but also to the various system components as described above with reference to FIG. 1. Further, illustrations of the process flows and the descriptions thereof may make reference to user windows, webpages, websites, web forms, prompts, etc. Practitioners will appreciate that the illustrated steps described herein may comprise any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

Taking a closer look at the spawning process, the router 135 performs the spawning to ensure an optimum number of MFM transactions are executing. Router 135 controls the spawning mechanism using a pre-defined algorithm. For example, an algorithm may be determined by estimating an average response time relative to a Service Level Agreement (SLA) while spawning new transactions. A SLA may be an agreement between a supplier and consumer of computing assets. For example, a supplier may promise a merchant that a credit authorization transaction will take no longer than eight seconds. This may be defined within a SLA. Router 135 executes a spawning process at three levels, otherwise known as a three-tier spawning mechanism. For example, when a thread is initiated first, router 135 periodically determines whether or not new threads should be started. It then spawns more threads when a particular thread is closed. The requisite number of threads to be started is dependent on, for example, the current queue depth, number of messages to be processed within SLA time and number of threads executing in the system.

Below is an example which explains the logic employed to manage the spawning process. Consider a service which has an average response time of 500 milliseconds and an SLA of one second, thus two messages may be processed per second. If the current queue depth is 100, then a total of 50 threads are needed to process all the messages within the SLA time.

The requisite number of new threads are invoked by first creating, and then placing, the trigger messages into shared initiation queue 115. Placing the trigger messages into shared initiation queue 115 provides an opportunity for the new transaction to be invoked in order to start an available Application Owning Region (AOR) 130. During the spawning of additional threads, it would be likely that other threads running at that time are also spawning. Therefore, a need may exist to prevent duplicate spawning. Further, MQ does not provide an exact number of threads running against a shared queue in all queue managers 110. Therefore, to track the exact number of threads servicing against a shared queue, the system needs to define a shared queue as thread count queue 160. Thread count queue 160 tracks the number of threads running in the system. When a thread is invoked, the thread transmits a message to thread count queue 160. When shutting down, the thread deletes the corresponding message from thread count queue 160. This enables the spawning process to be aware of exactly how many threads are running at any given moment, thus preventing the spawning process from over spawning.

An exemplary formula that is used to spawn new threads is as follows: ((current queue depth/number of messages to be processed in SLA time)−number of threads already executing in the system)*spawning multiplier. Consider the following scenario for example. A current queue depth is 30, the number of messages to be processed within SLA time is 1 and the number of threads executing in the system is 10 and the spawning multiplier is 2. Based on this scenario, the number of threads to be started equals ((30/1)−10)=20. However, the problem with this equation is that there are only 20 new threads started and they are readily available to process the messages. The 20 messages will be processed with 10 messages remaining in the queue. The remaining messages will only be processed when the 10 currently executing threads are free to be processed. Therefore, the spawning formula includes a multiplier to resolve this issue. The spawning multiplier is 2 in this scenario, therefore the number of threads will be; 2*20=40. To improve the response time of transactions, it may be essential to spawn more threads to ensure that additional threads will remain free to wait on the shared request queue 100 for the messages to arrive. When messages arrive, then the threads are immediately available to begin processing, thus reducing or eliminating possible delays in startup.

The spawning process alone may not be enough to ramp up and ramp down the threads necessary to process the incoming messages. In the self spawning mechanism, if all the threads executing are stalled while awaiting processing within the system due to DB2 contention, for example, the spawning mechanism will cease. If this occurs, all subsequent incoming messages will remain in the request queue where they will timeout. Therefore, an Interval Control Unit (ICE) chain mechanism is employed to prevent the timeout problem.

The ICE chain transaction is a transaction which activates at a predefined frequency as indicated in the CTS table, and checks the current queue depth, if the current queue depth is greater than a preset limit from the CTS table, then the ICE chain transaction will spawn a new thread, and the new thread will spawn the necessary number of new threads and all or any portion of the new threads started will continue processing the messages while the DB2 contention issues are being resolved.

FIG. 2 is a flowchart illustrating an exemplary message processing at the initiator level. Upon being invoked by trigger monitor 120, initiator 125 retrieves the trigger message (step 200) which is later passed to router 135 to be used as a template for the trigger messages to be created while spawning new threads. Initiator 125 issues a Handle Abend condition (step 205) in order to capture control in case the application encounters a hard abend (step 225). The Handle Abend condition further executes abend processing steps such as executing a sync point rollback (step 230), log the abend into TDQ and DB2 logs (step 235), and call MQ I/O Module 145 to put a reply message into reply queue 150 and delete a message from thread count queue 160 (step 240). Initiator 125 issues CICS link to execute router 135 (step 210). When router 135 has completed message processing (step 215), initiator 125 terminates the thread and returns control to CICS (step 220).

FIG. 3A is a flowchart illustrating a detailed view of an exemplary message processing method within CICS. Specifically, FIG. 3A illustrates the process flow from router 135. When initiator program 125 receives a trigger message, it invokes the router 135 to begin processing the request for placement into a queue. The router 135 first retrieves the corresponding control entries from the CTS table (step 300) which contains MFM specific processing parameters. Router 135 then puts a message into thread count queue 160 to indicate that a new thread has been started (step 305). In order to determine the number of executing threads, router 135 inquires on shared request queue 100 in order to get the current queue depth, and to inquire on the thread count queue to get the number of threads executing (step 310). Router 135 invokes MQ I/O Module 145 to get a request message from the shared request queue (step 315) and spawning logic is executed to compute the number of threads to be started (step 320). If router 135 determines according to the spawning logic that more threads are required to process the request messages, router 135 invokes MQ I/O Module 145 to start new threads by putting the trigger messages into shared initiation queue 115 or by invoking CICS Start (step 325). Through iterative processing of messages from shared request queue 100, router 135 validates the security of the requester through the user ID within the request (step 330).

FIG. 3B is a flowchart illustrating a continuation of a detailed view of an exemplary message processing method within CICS. Continuing with request processing as described above, router 135 calls MFM program 140 to execute the business logic and format the reply message (step 240). If MFM 140 program fails to execute the business logic and format the reply message due to a user or DB2 error (step 345), then router 135 rolls back the work and logs the error messages into an appropriate database log which may be dependent on the nature of the logging flags (step 380). Following successful execution of business logic and formatting (step 345), MFM program 140 passes the reply back to router 135. When the reply message is received at router 135, it executes MQ I/O Module 145 to put the reply message into the reply queue (step 350). Router 135 then takes a sync point if the limit has been reached (step 355) in order to relinquish the resources. To relinquish resources (step 360), router 135 executes CICS Delay if the resource limit has been reached. Alternatively, resources may also be relinquished (step 360) by executing a command to cancel request processing.

Router 135 next inquires on shared request queue 100 to get the current queue depth, and query thread count queue 160 to determine the number of threads executing. If the system needs to start new threads, router 135 invokes the process either by, for example, putting the trigger message into shared initiation queue 115 or by invoking C1 CS Start (step 365). If additional request messages remain (step 370), then router 135 retrieves the next message from the request queue (step 385) where the process may be repeated starting at, for example, step 305. If no additional request messages remain in the shared request queue (step 370), then router 135 closes shared request queue 100 and reply queue 150. Router 135 further deletes the corresponding message from thread count queue 160 when there are no more request messages or if the thread has reached the processing limit (step 375). The shared request queue 100, the shared initiation queue 115, and the reply queue 150 can be located in the same queue.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method performed by a server computer for facilitating management of a request from a user computer, said method comprising:
   receiving, by said server computer, said request from said user computer;
   storing said request into a first queue;
   generating a trigger message in response to said request;
   storing said trigger message in a second queue;
   retrieving business logic corresponding at least in part to said request;
   storing a message corresponding to said request into a thread count queue, a number of messages stored in said thread count queue corresponding to a number of threads that have begun executing;
   determining a number of executing threads using said thread count queue;
   retrieving said request from said first queue;
   determining a number of threads to execute said request;
   spawning new threads to process said request based upon said number of executing threads and said number of threads to execute said request;
   tracking said number of executing threads with respect to said thread count queue to prevent over spawning;
   formatting a reply message corresponding to said request, wherein said formatting is based upon said business logic; and
   storing said reply message into a third queue.

2. The method of claim 1, further including spawning new threads to process said request based on a pre-defined equation.

3. The method of claim 1, further including validating an identity of a user based upon authentication credentials imbedded in said request.

4. The method of claim 1, where said formatting further includes processing errors occurring during said formatting of said reply message.

5. The method of claim 1, wherein said first queue, second queue and third queue are located in the same queue.

6. A computer-readable storage medium storing thereon a set of instructions executable by a general purpose computer configured to perform a method for facilitating management of a request from a user computer, said method comprising:
   receiving a request from said user computer;
   storing said request into a first queue;
   generating a trigger message in response to said request;
   storing said trigger message in a second queue;
   retrieving business logic corresponding at least in part to said request;
   storing a message corresponding to said request into a thread count queue, a number of messages stored in said thread count queue corresponding to a number of threads that have begun executing;
   determining a number of executing threads using said thread count queue;
   retrieving said request from said first queue;
   determining a number of threads to execute said request;
   spawning new threads to process said request based upon said number of executing threads and said number of threads to execute said request;
   tracking said number of executing threads with respect to said thread count queue to prevent over spawning;
   formatting a reply message corresponding to said request, wherein said formatting is based upon said business logic; and
   storing said reply message into a third queue.

* * * * *

UNITED STATES PATENT AND TRADEMARK OFFICE
CERTIFICATE OF CORRECTION

PATENT NO. : 7,653,905 B1  Page 1 of 1
APPLICATION NO. : 10/906279
DATED : January 26, 2010
INVENTOR(S) : Krishna K. Lingamneni It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1232 days.

Signed and Sealed this

Twenty-third Day of November, 2010

David J. Kappos
*Director of the United States Patent and Trademark Office*